United States Patent
Aochi et al.

(10) Patent No.: US 10,489,227 B2
(45) Date of Patent: *Nov. 26, 2019

(54) MEMORY SYSTEM

(71) Applicant: Toshiba Memory Corporation, Minato-ku (JP)

(72) Inventors: Masami Aochi, Yokohama (JP); Yoshihisa Kojima, Kawasaki (JP); Nobuyuki Suzuki, Kawasaki (JP)

(73) Assignee: Toshiba Memory Corporation, Minato-ku (JP)

( * ) Notice: Subject to any disclaimer, the term of this patent is extended or adjusted under 35 U.S.C. 154(b) by 43 days.

This patent is subject to a terminal disclaimer.

(21) Appl. No.: 15/847,437

(22) Filed: Dec. 19, 2017

(65) Prior Publication Data

US 2018/0107536 A1 Apr. 19, 2018

Related U.S. Application Data

(63) Continuation of application No. 14/640,856, filed on Mar. 6, 2015, now Pat. No. 9,891,974.

(60) Provisional application No. 62/048,662, filed on Sep. 10, 2014.

(51) Int. Cl.
| | |
|---|---|
| *G06F 11/00* | (2006.01) |
| *G06F 11/07* | (2006.01) |
| *G06F 12/02* | (2006.01) |
| *G06F 1/30* | (2006.01) |
| *G06F 1/26* | (2006.01) |

(52) U.S. Cl.
CPC ......... *G06F 11/0727* (2013.01); *G06F 1/263* (2013.01); *G06F 1/30* (2013.01); *G06F 12/0246* (2013.01); *G06F 2212/7201* (2013.01); *G06F 2212/7203* (2013.01)

(58) Field of Classification Search
USPC .......................................... 714/14
See application file for complete search history.

(56) References Cited

U.S. PATENT DOCUMENTS

| | | | |
|---|---|---|---|
| 2009/0201721 A1* | 8/2009 | Ha | G11C 13/0004 365/163 |
| 2009/0240961 A1 | 9/2009 | Koike | |
| 2009/0300413 A1* | 12/2009 | Chang | G06F 11/1024 714/6.13 |
| 2010/0083048 A1* | 4/2010 | Calinoiu | G06F 11/0787 714/38.11 |
| 2011/0202554 A1 | 8/2011 | Powilleit | |
| 2011/0225345 A1 | 9/2011 | Inoue et al. | |

(Continued)

FOREIGN PATENT DOCUMENTS

| | | |
|---|---|---|
| JP | 2011 203970 | 10/2011 |
| JP | 2013 182283 | 9/2013 |

*Primary Examiner* — Sarai E Butler
(74) *Attorney, Agent, or Firm* — Oblon, McClelland, Maier & Neustadt, L.L.P.

(57) ABSTRACT

According to one embodiment, a memory system includes a non-volatile first memory, a second memory, a battery, a first processor, and a second processor. The first processor is configured to execute fault diagnosis on the battery by discharging energy stored in the battery. The second processor is configured to write data cached in the second memory into the first memory and reduce an upper limit of the amount of data to be cached when executing the fault diagnosis than the upper limit of the amount of data to be cached when not executing the fault diagnosis.

21 Claims, 8 Drawing Sheets

(56) References Cited

U.S. PATENT DOCUMENTS

| | | |
|---|---|---|
| 2012/0256568 A1 | 10/2012 | Lee |
| 2013/0088201 A1 | 4/2013 | Iwasawa |
| 2013/0097458 A1* | 4/2013 | Sekino ................ G06F 11/1441 714/6.3 |
| 2014/0006834 A1* | 1/2014 | Ishii .......................... G06F 1/30 713/340 |

\* cited by examiner

MEMORY SYSTEM

CROSS-REFERENCE TO RELATED APPLICATIONS

This application is a continuation of U.S. application Ser. No. 14/640,856, filed on Mar. 6, 2015, which is based upon and claims the benefit of priority from U.S. Provisional Application No. 62/048,662, filed on Sep. 10, 2014; the entire contents of each of which are incorporated herein by reference.

FIELD

Embodiments described herein relate generally a memory system.

BACKGROUND

There is conventionally a memory system including a non-volatile memory, a volatile memory, and a rechargeable battery. Various pieces of data are cached in the volatile memory. In a normal power off sequence, the various pieces of data cached in the volatile memory are written into the non-volatile memory using power supplied from the outside. When power-down different from normal occurs, energy stored in the rechargeable battery is used to write the various pieces of data into the non-volatile memory.

DETAILED DESCRIPTION

In general, according to one embodiment, a memory system includes a non-volatile first memory, a second memory, a battery, a first processor, and a second processor. The first processor is configured to execute fault diagnosis on the battery by discharging energy stored in the battery. The second processor is configured to write data cached in the second memory into the first memory and reduce an upper limit of the amount of data to be cached when executing the fault diagnosis than the upper limit of the amount of data to be cached when not executing the fault diagnosis.

Exemplary embodiments of a memory system will be explained below in detail with reference to the accompanying drawings. The present invention is not limited to the following embodiments.

First Embodiment

Figure 1:
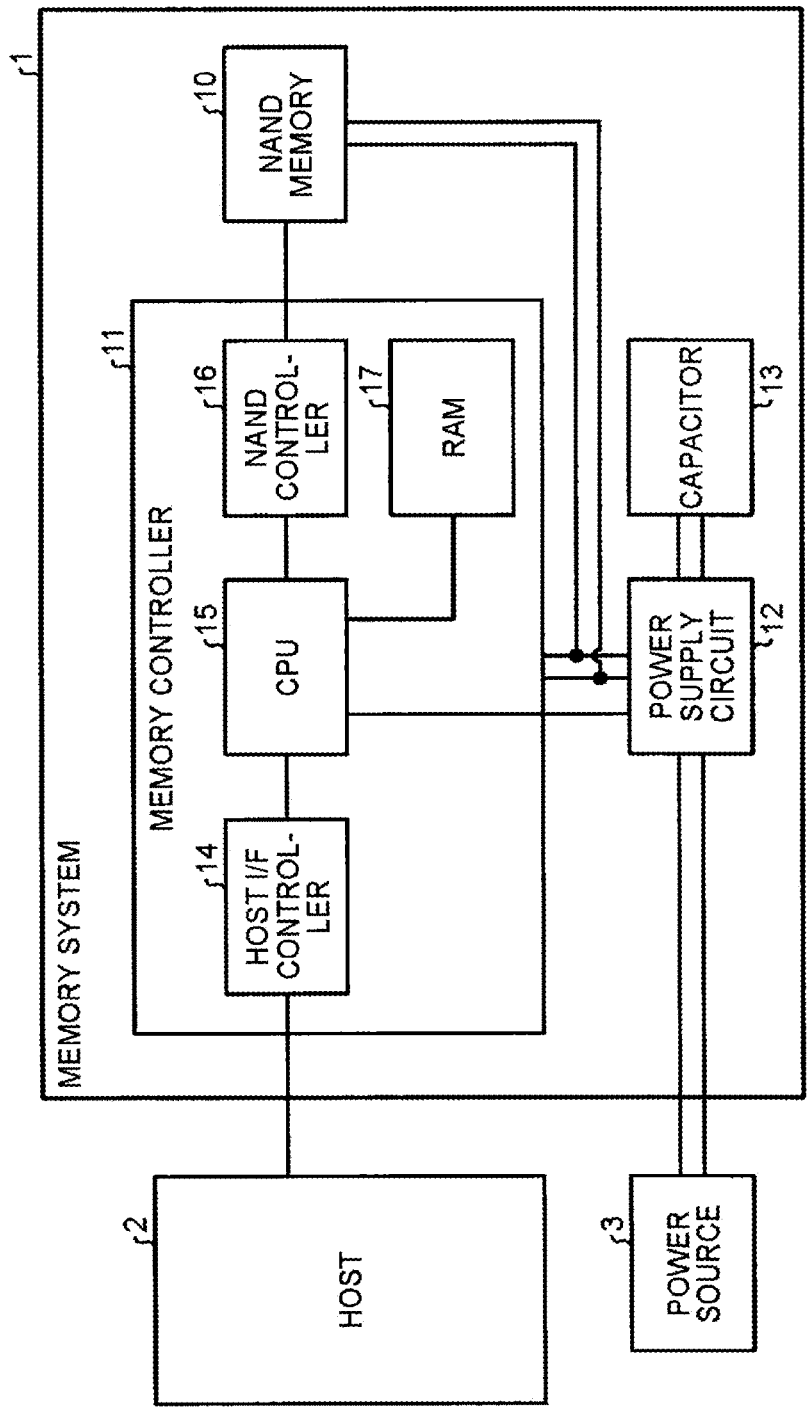
FIG. 1 is a diagram illustrating a configuration example of a memory system of a first embodiment.

FIG. 1 is a diagram illustrating a configuration example of a memory system of a first embodiment. A memory system 1 is connected to a host 2 by a predetermined communication interface. The host 2 corresponds to, for example, a personal computer, server, or CPU (Central Processing Unit). The memory system 1 is connected to an external power source 3, and is supplied with electric power by the power source 3. The memory system 1 uses the power from the power source 3 to operate. The memory system 1 functions as an external storage device of the host 2. The memory system 1 can accept access commands (a read command and a write command) from the host 2. After the write command, the memory system 1 subsequently accepts data targeted to be written (write data). The access command includes logical address information (a logical address) indicating an access destination.

The memory system 1 includes a NAND flash memory (NAND memory) 10 and a memory controller 11 that transfers data between the host 2 and the NAND memory 10. The memory system 1 can include an arbitrary non-volatile memory instead of the NAND memory 10. For example, the memory system 1 can include a NOR flash memory instead of the NAND memory 10.

The memory system 1 further includes a power supply circuit 12 and a capacitor 13. The power supply circuit 12 supplies the power supplied from the power source 3, after conversion or as it is, to the NAND memory 10 and the memory controller 11. The memory controller 11 and the NAND memory 10 use the power supplied from the power supply circuit 12 to operate.

The memory system 1 receives a power-off notice from the host 2 before power-off. When having received the power-off notice, the CPU 15 starts a power off sequence (normal power off sequence). An event in which the supply of power is stopped without a power-off notice is expressed as power-down. The capacitor 13 is a rechargeable battery that stores power used to execute a power off sequence upon power-down. The normal power off sequence and the power off sequence upon power-down may be different or the same.

When power is being supplied from the power source 3, the capacitor 13 is charged by the power supply circuit 12. Upon power-down, the power supply source is switched by the power supply circuit 12 from the power source 3 to the capacitor 13, and the capacitor 13 supplies power to the NAND memory 10 and the memory controller 11 via the power supply circuit 12. The memory system 1 can adopt an arbitrary battery as the rechargeable battery. For example, an electrolytic capacitor or an electrical double layer capacitor can be applied as the rechargeable battery.

The memory controller 11 includes a host interface controller (host I/F controller) 14, a CPU 15, a NAND controller 16, and a RAM (Random Access Memory) 17. The CPU 15 controls the entire memory controller 11 based on firmware. The host I/F controller 14 controls a communication interface in between with the host 2. Moreover, the host I/F controller 14 transfers data between the host 2 and the RAM 17 under control of the CPU 15. The NAND controller 16 transfers data between the NAND memory 10 and the RAM 17 under control of the CPU 15. The functions of the CPU 15 are described below.

Figure 2:
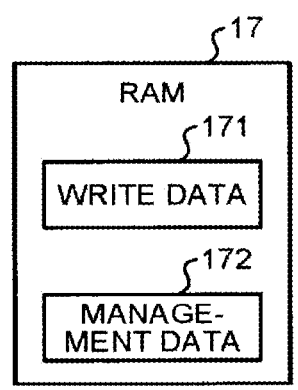
FIG. 2 is a diagram illustrating a memory configuration of a RAM.

FIG. 2 is a diagram illustrating a memory configuration of the RAM 17. Write data 171 and management data 172 are cached in the RAM 17. A volatile memory other than the RAM 17 can be adopted as a memory to cache various pieces of data. Moreover, for example, an arbitrary volatile or non-volatile memory that can operate at faster speed than the NAND memory 10 can be applied as the memory to cache various pieces of data. The host I/F controller 14 stores the write data 171 from the host 2 as cached data in the RAM 17. The write data 171 stored in the RAM 17 is later written into the NAND memory 10 by the NAND controller 16.

The management data 172 is information required to control the memory controller 11. A part or all of the management data 172 is read by the RAM 17 at startup, and used or updated by the CPU 15. The management data 172 may contain, for example, translation information in which the corresponding relationship between a logical address used to specify an access destination by the host 2 and a physical address indicating a physical location in the NAND memory 10 is described. The translation information is referred to upon accessing the NAND memory 10, and updated upon writing into the NAND memory 10. Moreover, the management data 172 may contain a log in which an event that has occurred during operation is recorded. The log is rewritten, for example, upon occurrence of an abnormality. Moreover, the management data 172 may contain various parameters for the operation. The various parameters are updated, for example, upon change of the operation mode.

Moreover, the NAND memory 10 includes a plurality of blocks. The block is, for example, a unit of an erase operation. The management data 172 may contain block management information in which the number of erases, the number of reads, the amount of valid data, or the like is recorded on a block-by-block basis. The block management information is referred to or updated, for example, upon execution of garbage collection (compaction), wear leveling, or refresh.

In the normal power off sequence and the power off sequence upon power-down, data of the write data 171, which has not been written into the NAND memory 10, is written into the NAND memory 10 under control of the CPU 15. Moreover, at least a part of the management data 172, which has been changed from the management data written into the NAND memory 10, is written into the NAND memory 10 under control of the CPU 15. Hereinafter, the data of the write data 171, which has not been written into the NAND memory 10, and the part of the management data 172, which has been changed from the management data written into the NAND memory 10, are expressed as dirty data.

Figure 3:
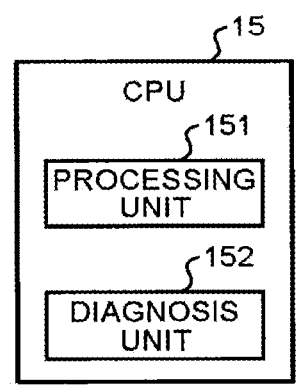
FIG. 3 is a diagram illustrating a functional configuration of a CPU.

FIG. 3 is a diagram illustrating a functional configuration of the CPU 15. The CPU 15 functions as a processing unit 151 and a diagnosis unit 152 based on the firmware. A part or all of the processing unit 151 and the diagnosis unit 152 can also be configured of a hardware circuit.

The processing unit 151 controls data transfer from the host 2 to the NAND memory 10 via the RAM 17. The processing unit 151 writes dirty data into the NAND memory 10 as a part of the control of data transfer. A process of writing dirty data from the RAM 17 into the NAND memory 10 is expressed as a non-volatilization process. The processing unit 151 executes the non-volatilization process at any given timing. The processing unit 151 executes the non-volatilization process, for example, at timing when other processes are not performed.

Furthermore, the processing unit 151 executes non-volatilization process such that the total amount of dirty data does not exceed the set upper limit, as appropriate. If the total amount of dirty data is expected to exceed the set upper limit when new dirty data is added, the processing unit 151 performs the non-volatilization process and then adds the new dirty data. The set upper limit is a threshold value determined according to electric energy (hereinafter simply the energy) stored in the capacitor 13 to complete the power off sequence upon power-down. In other words, a value equal to or smaller than a total data size that can be written into the NAND memory 10 by the energy stored in the capacitor 13 is set as the set upper limit.

The diagnosis unit 152 executes fault diagnosis on the capacitor 13 at predetermined timings. The execution timings of fault diagnosis can be freely set according to the design. For example, fault diagnosis is executed in cycles of once in 24 hours. The fault diagnosis at least includes a determination of whether or not the function of the capacitor 13 is sound, or a check on the state of the capacitor 13. "Being sound", for example, means having the capability of storing the energy of a predetermined amount. Or "being sound", for example, means that input speed or output speed of the energy satisfies a predetermined condition. The fault diagnosis may be executed when the capacitor 13 has failed to operate normally, or executed periodically. Moreover, the fault diagnosis may be executed triggered by the occurrence of a predetermined event. In the fault diagnosis, the diagnosis unit 152 instructs the power supply circuit 12 to discharge the capacitor 13. When having received the discharge instruction, the power supply circuit 12 discharges the capacitor 13 until the voltage across the capacitor 13 drops from a first voltage to a second voltage that is lower than the first voltage, and measures the discharge time. The first voltage is a voltage in a state of full charge. The voltage at which the capacitor 13 is fully charged may be set as the first voltage. Alternatively, a voltage lower than the voltage in the state of full charge may be set as the first voltage. The energy discharged upon fault diagnosis is consumed by, for example, a resistor for diagnosis. In terms of the second voltage, a voltage as high as possible is set so that, for example, a difference from the first voltage is large enough to be able to detect a fault with required accuracy and the amount of dirty data that can be written into the NAND memory 10 is as large as possible when power-down occurs during fault diagnosis.

The power supply circuit 12 measures the voltage across the capacitor 13 and sequentially transmits the measurement results to the diagnosis unit 152. The power supply circuit 12 or the memory controller 11 may include an AD converter that converts a measured voltage value into a digital value. When the voltage across the capacitor 13 reaches the second voltage, the diagnosis unit 152 causes the power supply circuit 12 to stop discharging the capacitor 13. The diagnosis unit 152 determines whether or not the capacitor 13 has a fault based on the measurement result.

The diagnosis unit 152 instructs the power supply circuit 12 to charge after the fault diagnosis. When having received the charge instruction, the power supply circuit 12 supplies power from the power source 3 to the capacitor 13 to charge the capacitor 13 until the voltage across the capacitor 13 reaches the first voltage.

Moreover, a fault diagnosis method based on the measurement result is arbitrary. For example, the diagnosis unit 152 computes the capacity of the capacitor 13 based on the time from the start to the stop of a discharge. The diagnosis unit 152 then determines that the capacitor 13 does not have a fault if the computed capacity is equal to or more than a predetermined value, and determines that the capacitor 13 has a fault if the computed capacity is less than the predetermined value.

In the first embodiment, the processing unit 151 uses a first set value in accordance with the first voltage as the set upper limit during execution of fault diagnosis, and uses a second set value in accordance with the second voltage as the set upper limit during non-execution of fault diagnosis. The first set value is a value equal to or smaller than a data size that can be transferred from the RAM 17 to the NAND memory 10 by energy stored when the voltage across the capacitor 13 is the first voltage (the energy of a first storage amount). The transfer from the RAM 17 to the NAND memory 10 includes a procedure from when data is read from the RAM 17 to when the data is stored in a memory cell array included in the NAND memory 10. The second set value is a value equal to or smaller than a data size that can be transferred from the RAM 17 to the NAND memory 10 by energy stored when the voltage across the capacitor 13 is the second voltage (the energy of a second storage amount). The second voltage is smaller than the first voltage. Accordingly, the second set value is smaller than the first set value.

The memory controller 11 and the NAND memory 10 may change in the amount of power consumption depending on the temperature. The memory controller 11 includes, for example, a temperature sensor. The processing unit 151 may change the first set value and the second set value depending on the detection value of the temperature sensor.

Moreover, the capacity of the capacitor 13 reduces over the operating time. The processing unit 151 may change the first set value and the second set value depending on the capacity measured upon fault diagnosis. Moreover, fixed values may be set for the first and second set values based on, for example, an expected capacity of the capacitor 13 at the time that the product life has elapsed.

Figure 4:
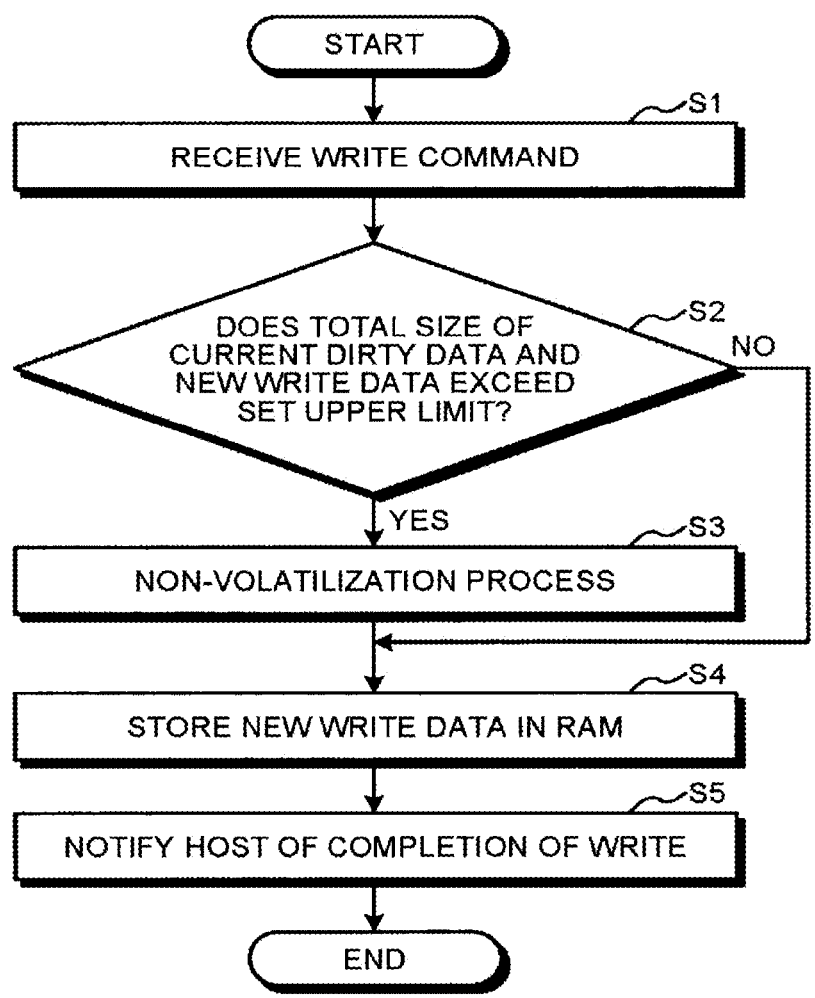
FIG. 4 is a flowchart illustrating the operation of the memory system of when having received a write command.

FIG. 4 is a flowchart illustrating the operation of the memory system 1 of when having received a write command. When the memory system 1 has received a write command (S1), the processing unit 151 determines whether or not the total size of dirty data stored in the RAM 17 (expressed as the current dirty data) and write data to be written by the write command received in the process of S1 (expressed as the new write data) exceeds the set upper limit (S2). If the total size of the current dirty data and the new write data exceeds the set upper limit (S2, Yes), the processing unit 151 executes the non-volatilization process such that the total size of dirty data becomes equal to or less than the set upper limit even if the new write data is stored in the RAM 17 (S3). The processing unit 151 writes a part or all of the current dirty data into the NAND memory 10 by the non-volatilization process. The non-volatilization process is described below. After the non-volatilization process, the processing unit 151 receives the new write data from the host 2 and stores the received new write data into the RAM 17 (S4). The processing unit 151 manages the new write data stored in the RAM 17 as dirty data. If the total size of the current dirty data and the new write data does not exceed the set upper limit (S2, No), the process of S3 is skipped. After the process of S4, the processing unit 151 notifies the host 2 of the completion of the write (S5), and ends the operation.

Figure 5:
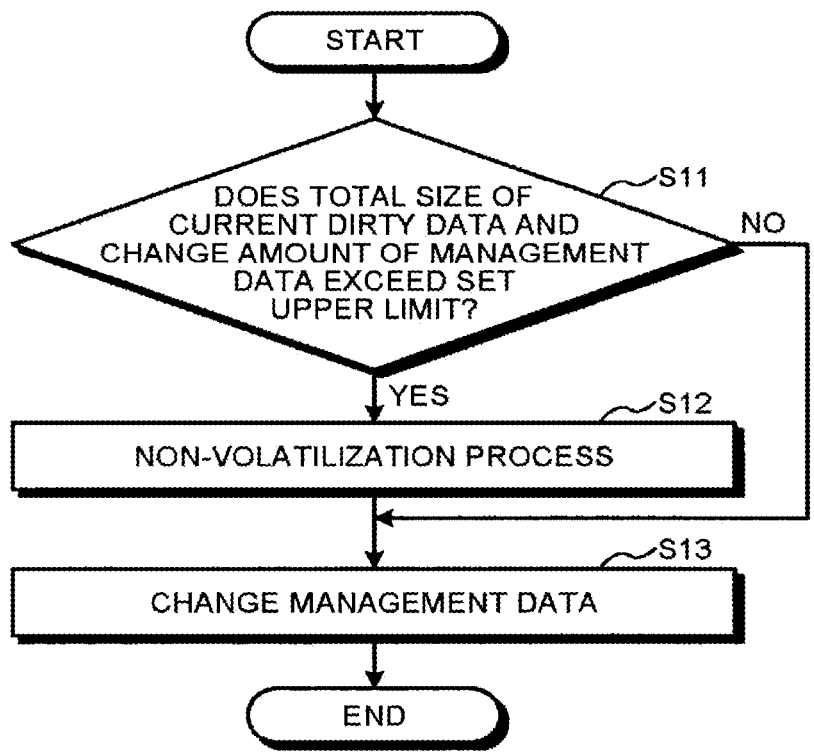
FIG. 5 is a flowchart illustrating the operation of the memory system upon change of management data.

FIG. 5 is a flowchart illustrating the operation of the memory system 1 upon change of the management data 172. The change of the management data 172 includes rewriting of a part or all of the management data 172 and addition of new data to the management data 172. If an event that requires the change of the management data 172 occurs, the processing unit 151 determines whether or not the total size of the current dirty data and the changed part of the management data 172 exceeds the set upper limit (S11). If the total size of the current dirty data and the changed part of the management data 172 exceeds the set upper limit (S11, Yes), the processing unit 151 executes the non-volatilization process (S12). After the non-volatilization process, the processing unit 151 executes the change of the management data 172 (S13), and ends the operation. If the total size of the current dirty data and the changed part of the management data 172 does not exceed the set upper limit (S11, No), the processing unit 151 skips the process of S12.

Figure 6:
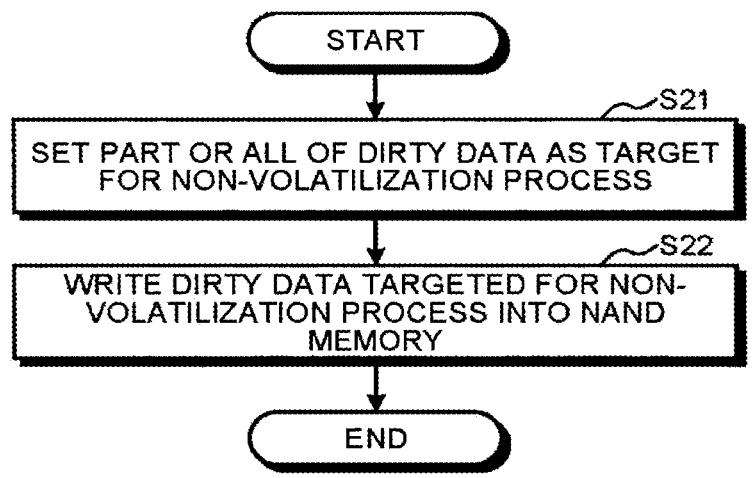
FIG. 6 is a flowchart illustrating a non-volatilization process.

FIG. 6 is a flowchart illustrating the non-volatilization process. The processing unit 151 sets a part or all of dirty data as a target of the non-volatilization process (S21). Any piece of dirty data can be freely targeted for the non-volatilization process. For example, the processing unit 151 may give a higher priority to dirty data within the write data 171 than dirty data within the management data 172 to set the dirty data within the write data 171 as the target of the non-volatilization process. Moreover, the processing unit 151 may give a higher priority to the dirty data within the management data 172 than the dirty data within the write data 171 to set the dirty data within the management data 172 as the target of the non-volatilization process. After the process of S21, the processing unit 151 writes the target for the non-volatilization process into the NAND memory 10 (S22), and ends the non-volatilization process. If the dirty data of the write data 171 is written into the NAND memory 10, the processing unit 151 may delete the already written dirty data from the RAM 17.

Figure 7:
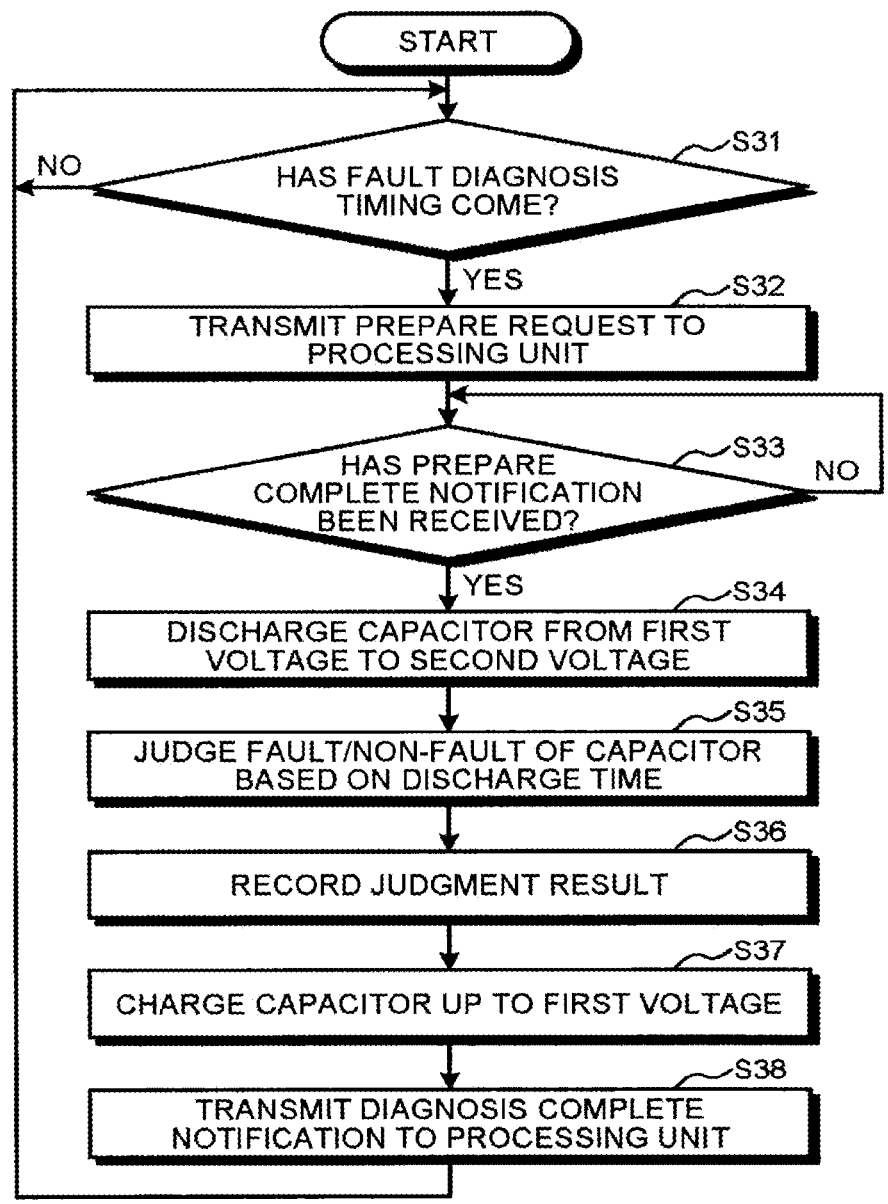
FIG. 7 is a flowchart illustrating the operation of a diagnosis unit.

FIG. 7 is a flowchart illustrating the operation of the diagnosis unit 152. The diagnosis unit 152 determines whether or not fault diagnosis timing has come (S31). If the fault diagnosis timing has not come (S31, No), the diagnosis unit 152 reexecutes the process of S31. If the fault diagnosis timing has come (S31, Yes), the diagnosis unit 152 transmits a prepare request to the processing unit 151 (S32). In the processing unit 151, the set upper limit is changed after the prepare request is received. The change of the set upper limit is described below. After transmitting the prepare request to the processing unit 151, the diagnosis unit 152 determines whether or not to have received a prepare complete notification from the processing unit 151 (S33). If having not received the prepare complete notification (S33, No), the diagnosis unit 152 reexecutes the process of S33. If having received the prepare complete notification (S33, Yes), the diagnosis unit 152 discharges the capacitor 13 until the voltage across the capacitor 13 drops from the first voltage to the second voltage (S34). The diagnosis unit 152 then judges whether or not the capacitor 13 has a fault, based on the time taken for the discharge (S35). The diagnosis unit 152 records the judgment result (S36), and charges the capacitor 13 until the voltage across the capacitor 13 reaches the first voltage (S37). The diagnosis unit 152 transmits a diagnosis complete notification to the processing unit 151 (S38), and reexecutes the process of S31. If having judged that the capacitor 13 has a fault, the diagnosis unit 152 may notify the host 2 of information to the effect that the capacitor 13 has a fault.

Figure 8:
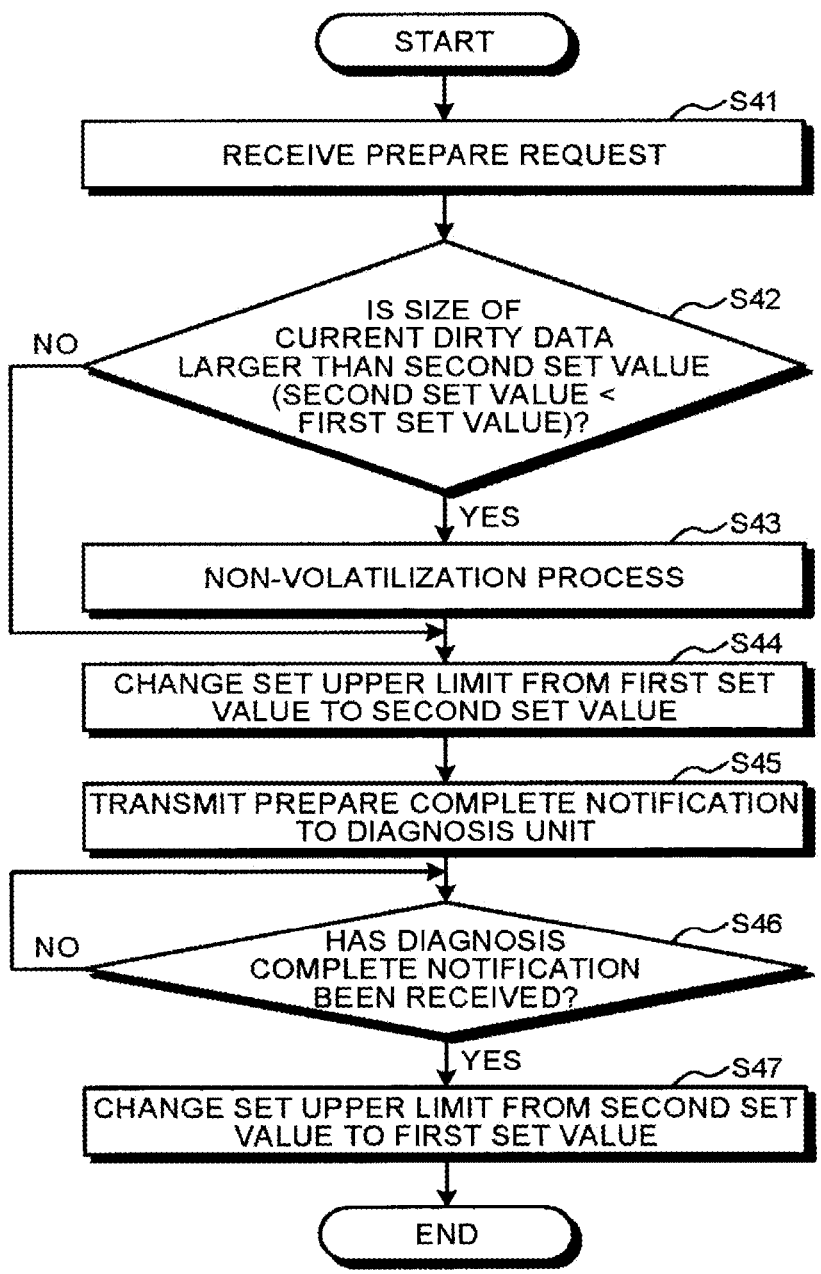
FIG. 8 is a flowchart illustrating the operation of a processing unit of when having received a prepare request from the diagnosis unit.

FIG. 8 is a flowchart illustrating the operation of the processing unit 151 of when having received the prepare request from the diagnosis unit 152. If having received the prepare request (S41), the processing unit 151 determines whether or not the total size of the current dirty data exceeds the second set value (S42). If the total size of the current dirty data exceeds the second set value (S42, Yes), the processing unit 151 executes the non-volatilization process such that the total size of the dirty data becomes equal to or less than the second set value (S43). After the process of S43, the processing unit 151 changes the set upper limit from the first set value to the second set value (S44). If the total size of the current dirty data does not exceed the second set value (S42, No), the processing unit 151 skips the process of S43. After the process of S44, the processing unit 151 transmits the prepare complete notification to the diagnosis unit 152 (S45). The processing unit 151 then determines whether or not to have received the diagnosis complete notification from the diagnosis unit 152 (S46). If having not received the diagnosis complete notification (S46, No), the processing unit 151 reexecutes the process of S46. If having received the diagnosis complete notification (S46, Yes), the processing unit 151 changes the set upper limit from the second set value to the first set value (S47), and ends the operation.

Figure 9:
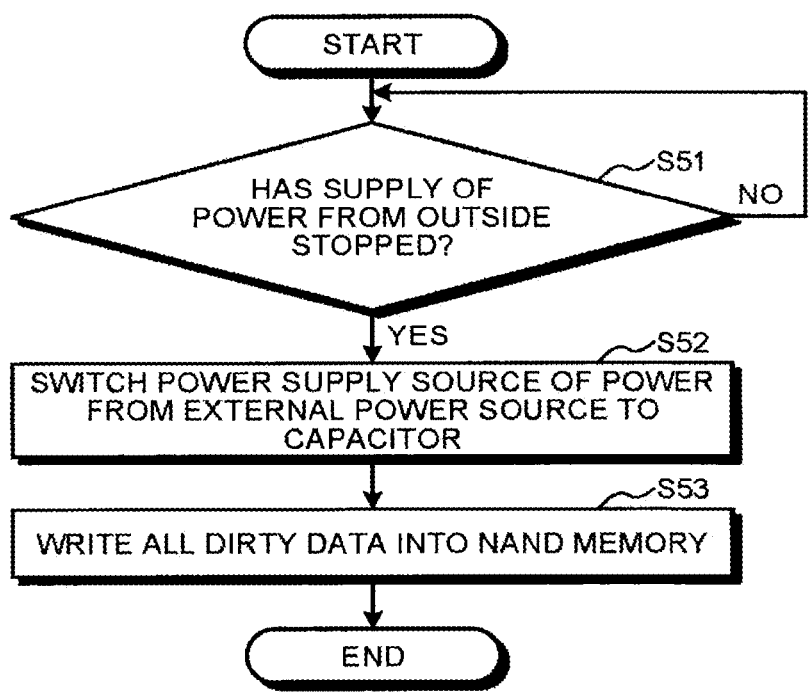
FIG. 9 is a flowchart illustrating the operation of the memory system upon power-down.

FIG. 9 is a flowchart illustrating the operation of the memory system 1 upon power-down. The power supply circuit 12 determines whether or not the supply of power from the external power source 3 has stopped (S51). If the supply of power from the power source 3 has not stopped (S51, No), the power supply circuit 12 reexecutes the process of S51. If the supply of power from the power source 3 has stopped (S51, Yes), the power supply circuit 12 switches the power supply source from the power source 3 to the capacitor 13 (S52). The occurrence of power-down is notified by the power supply circuit 12 to the CPU 15. In the CPU 15, the processing unit 151 writes all the dirty data into the NAND memory 10 (S53). After the process of S53, the operation ends.

As described above, according to the first embodiment, the diagnosis unit 152 discharges the energy stored in the capacitor 13 to execute fault diagnosis on the capacitor 13. The processing unit 151 writes data cached in the RAM 17 (the write data 171 and the management data 172) into the NAND memory 10. Upon execution of fault diagnosis, the processing unit 151 reduces the upper limit of the amount of data to be cached compared with upon non-execution of fault diagnosis. Consequently, even if power-down occurs during execution of fault diagnosis, the data held as dirty data in the RAM 17 can be prevented from being lost. Moreover, it is possible to eliminate the need of including a redundant capacitor 13 for fault diagnosis.

When the supply of power from the power source 3 is stopped, the processing unit 151 uses the energy stored in the capacitor 13 to write each piece of data cached in the RAM 17 into the NAND memory 10. Consequently, it is possible to prevent the loss of the data held as dirty data in the RAM 17 upon power-down.

Moreover, the diagnosis unit 152 discharges the energy stored in the capacitor 13 upon execution of fault diagnosis. After changing the upper limit of the amount of dirty data to be cached to the second set value smaller than the first set value, the processing unit 151 causes the diagnosis unit 152 to execute fault diagnosis. Consequently, even if power-down occurs during execution of fault diagnosis, the data held as dirty data in the RAM 17 can be prevented from being lost.

Moreover, the processing unit 151 changes the upper limit of the amount of dirty data to be cached from the second set value to the first set value after completion of the fault diagnosis. The upper limit of the amount of dirty data to be cached is limited and accordingly the write performance decreases. However, a period during which the second set value is used is sufficiently shorter than a period during which the first set value is used. Accordingly, the decrease of the write performance can be suppressed.

Moreover, the diagnosis unit 152 may notify the host 2 if having judged that the capacitor 13 has a fault.

Second Embodiment

Figure 10:
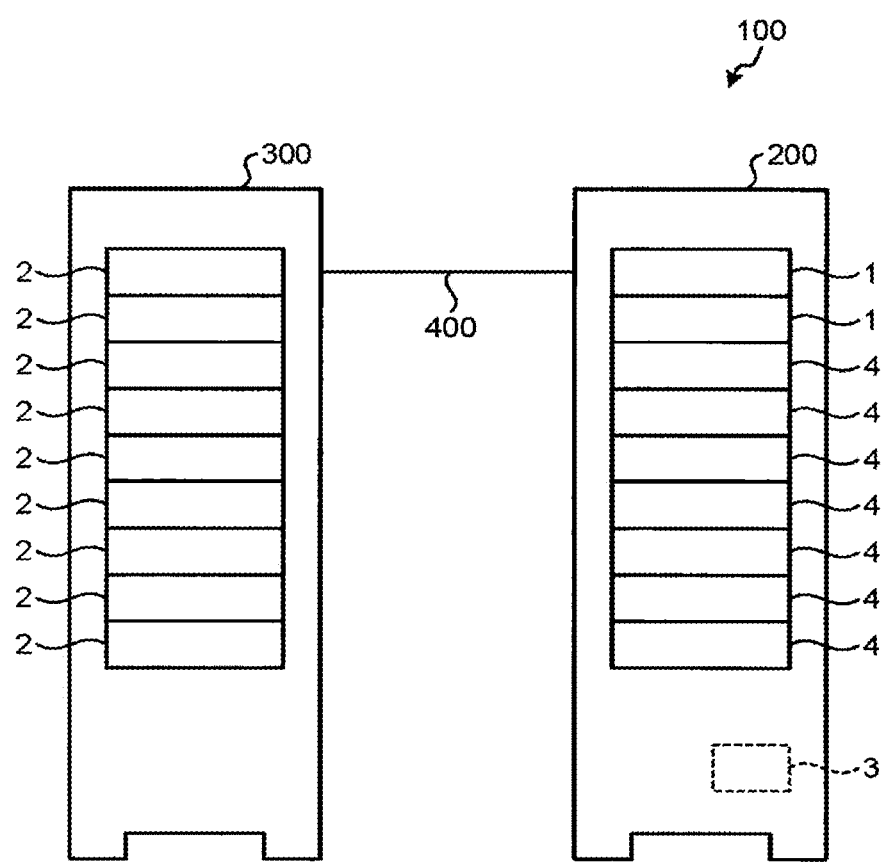
FIG. 10 is a diagram illustrating an implementation example of the memory system.

FIG. 10 is a diagram illustrating an implementation example of the memory system 1. The memory system 1 is implemented in, for example, a server system 100. A disk array 200 and a rack-mount server 300 are connected by a communication interface 400 to configure the server system 100. Any standard can be adopted as a standard of the communication interface 400. One or more hosts 2 are mounted in a server rack to configure the rack-mount server 300. Moreover, one or more memory systems 1 and one or more hard disk units 4 are mounted in a server rack to configure the disk array 200. The disk array 200 includes the power source 3. Power from the power source 3 is supplied to each unit mounted on the disk array 200 via an unillustrated backplane. In the disk array 200, for example, the one or more memory systems 1 are used as caches of the one or more hard disk units 4. A storage controller unit that builds RAID in the one or more hard disk units 4 may be mounted on the disk array 200.

Each memory system 1 has the configuration described in the first embodiment. Accordingly, even if the power source 3 fails suddenly, or each memory system is removed from the server rack during the operation of the server system 100, it becomes possible to prevent the loss of various pieces of data held as dirty data in the RAM 17 regardless of whether or not fault diagnosis is being executed on the capacitor 13.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of controlling a memory system that includes a volatile first memory and a battery, comprising:
   storing data into up to a first capacity of the volatile first memory in a case where an amount of energy stored in the battery is a first amount,
   controlling the battery to change the amount of energy stored in the battery from the first amount to a second amount that is smaller than the first amount, and
   storing the data into up to a second capacity of the volatile first memory in a case where the amount of energy stored in the battery is the second amount, the second capacity being smaller than the first capacity.

2. The method according to claim 1 further comprising driving the memory system using power from an outside of the memory system
   wherein the battery is a rechargeable battery including a capacitor and is charged by the power from the outside.

3. The method according to claim 2, wherein
   the memory system further includes a non-volatile second memory, and
   the method further comprises using the energy stored in the battery to write, into the non-volatile second memory, the data stored in the volatile first memory upon stop of the power from the outside.

4. The method according to claim 3, further comprising:
supplying the power from the outside to the memory system,
detecting the stop, and
starting, in response to detecting the stop, supplying power to the memory system by using the energy stored in the battery.

5. The method according to claim 3, further comprising controlling to change the amount of energy stored in the battery while executing diagnosis on the battery.

6. The method according to claim 1, wherein
the memory system further includes a non-volatile second memory,
the data includes user data and management data, and
the method further comprises
executing a writing of the data stored in the volatile first memory into the non-volatile second memory in accordance with the change of the amount of energy stored in the battery, and
writing the management data in preference to the user data.

7. The method according to claim 1, wherein
the memory system further includes a non-volatile second memory,
the data includes user data and management data, and
the method further comprises
executing a writing of the data stored in the volatile first memory into the non-volatile second memory in accordance with the change of the amount of energy stored in the battery, and
writing the user data in preference to the management data.

8. A memory system comprising:
a volatile first memory;
a battery; and
a controller circuit configured
to store data into up to a first capacity of the volatile first memory in a case where an amount of energy stored in the battery is a first amount,
to control the battery to change the amount of energy stored in the battery from the first amount to a second amount that is larger than the first amount, and
to store the data into up to a second capacity of the volatile first memory in a case where the amount of energy stored in the battery is the second amount, the second capacity being larger than the first capacity.

9. The memory system according to claim 8, wherein the memory system is driven by power from an outside of the memory system, and
the battery is a rechargeable battery including a capacitor and is charged by the power from the outside.

10. The memory system according to claim 9, further comprising:
a non-volatile second memory, wherein
the controller circuit uses the energy stored in the battery to write, into the non-volatile second memory, the data stored in the volatile first memory upon stop of the power from the outside.

11. The memory system according to claim 10, wherein the memory system further includes a power supply circuit configured to supply the power from the outside to the memory system, detect the stop, and start, in response to the detected stop, supplying power to the memory system by using the energy stored in the battery.

12. The memory system according to claim 10, wherein the controller circuit controls to change the amount of energy stored in the battery while executing diagnosis on the battery.

13. The memory system according to claim 8, further comprising:
a non-volatile second memory, wherein
the data includes user data and management data,
the controller circuit executes a writing of the data stored in the volatile first memory into the non-volatile second memory in accordance with the change of the amount of energy stored in the battery, and
the controller circuit writes the management data in preference to the user data.

14. The memory system according to claim 8, further comprising:
a non-volatile second memory, wherein
the data includes user data and management data,
the controller circuit executes a writing of the data stored in the volatile first memory into the non-volatile second memory in accordance with the change of the amount of energy stored in the battery, and
the controller circuit writes the user data in preference to the management data.

15. A method of controlling a memory system that includes a volatile first memory and a battery, comprising:
storing data into up to a first capacity of the volatile first memory in a case where an amount of energy stored in the battery is a first amount,
controlling the battery to change the amount of energy stored in the battery from the first amount to a second amount that is larger than the first amount, and
storing the data into up to a second capacity of the volatile first memory in a case where the amount of energy stored in the battery is the second amount, the second capacity being larger than the first capacity.

16. The method according to claim 15 further comprising driving the memory system using power from an outside of the memory system
wherein the battery is a rechargeable battery including a capacitor and is charged by the power from the outside.

17. The method according to claim 16, wherein
the memory system further includes a non-volatile second memory, and
the method further comprises using the energy stored in the battery to write, into the non-volatile second memory, the data stored in the volatile first memory upon stop of the power from the outside.

18. The method according to claim 17, further comprising:
supplying the power from the outside to the memory system,
detecting the stop, and
starting, in response to detecting the stop, supplying power to the memory system by using the energy stored in the battery.

19. The method according to claim 17, further comprising controlling to change the amount of energy stored in the battery while executing diagnosis on the battery.

20. The method according to claim 15, wherein
the memory system further includes a non-volatile second memory,
the data includes user data and management data, and
the method further comprises
executing a writing of the data stored in the volatile first memory into the non-volatile second memory in accordance with the change of the amount of energy stored in the battery, and writing the management data in preference to the user data.

21. The method according to claim 15, wherein
the memory system further includes a non-volatile second memory,
the data includes user data and management data, and
the method further comprising
executing a writing of the data stored in the volatile first memory into the non-volatile second memory in accordance with the change of the amount of energy stored in the battery, and
writing the user data in preference to the management data.

\* \* \* \* \*